United States Patent
Bengs et al.

(12) 
(10) Patent No.: US 6,342,300 B1
(45) Date of Patent: Jan. 29, 2002

US006342300B1

(54) BIODEGRADABLE POLYMERS BASED ON NATURAL AND RENEWABLE RAW MATERIALS ESPECIALLY ISOSORBITE

(75) Inventors: Holger Bengs, Frankfurt am Main; Alex Schoenfeld, Wiesbaden; Gitte Boehm, Frankfurt am Main; Siegfried Weis, Eppstein; Joachim Clauss, Frankfurt am Main, all of (DE)

(73) Assignee: Celanese Ventures GmbH, Frankfurt am Main (DE)

( * ) Notice: Subject to any disclaimer, the term of this patent is extended or adjusted under 35 U.S.C. 154(b) by 0 days.

(21) Appl. No.: 09/657,326

(22) Filed: Sep. 7, 2000

Related U.S. Application Data

(63) Continuation of application No. PCT/EP99/01112, filed on Feb. 20, 1999.

(51) Int. Cl.[7] .......................... B32B 15/02; C08G 63/06
(52) U.S. Cl. .................. 428/402.21; 528/272; 528/274; 528/298; 528/300; 528/302; 528/308.6; 528/361; 428/402.2; 428/402.24; 428/221; 424/489; 424/497
(58) Field of Search ................................ 528/272, 274, 528/298, 300, 302, 308.6, 361; 428/402.2, 402.21, 402.24, 221; 424/489, 497

(56) References Cited

FOREIGN PATENT DOCUMENTS

EP 0 483 606 A2 5/1992
EP 0 514 790 A2 11/1992

OTHER PUBLICATIONS

Okada et al., "Biodegradable polymers based on renewable resources. II. Synthesis and biodegradability of polyesters containing furan rings", J. Polym. Sci., Part A: Polym. Chem., 1997, 35(13), pp. 2729–2737. Chemical Abstract.

Okada et al., "Synthesis and biodegradability of polyesters based in 1,4:3,6–dianhydrohexitols and succinic acid derivatives", Stud. Polym. Sci., 1994, 12(Biodegradable Plastics and Polymers), 511–518. Chemical Abstract.

Okada, et al., "Synthesis and degradabilities of polyesters from 1,4:3,6–dianhydrohexitols and aliphatic dicarboxylic acids", J. Polym. Sci., Part A: Polym. Chem., 1995, 33(16), 2813–2820. Chemical Abstract.

Okada, et al., "Biodegradable polymers based on renewable resources: polyesters composed of 1,4:3,6–dianhydrohexitol and aliphatic dicarboxylic acid units", J. Appl. Polym. Sci., 1996, 62(13), 2257–2265. Chemical Abstract.

*Primary Examiner*—Samuel A. Acquah
(74) *Attorney, Agent, or Firm*—Gilberto M. Villacorta; Corinne M. Pauliquen; Katten Muchin Davis

(57) ABSTRACT

The invention relates to biodegradable polycondensates, to the production of said polycondensates, and to their use for releasing specific substances. The polycondensates are derived from at least three components chosen from the following group: a) dianhydrohexites b) bivalent (polyvalent) organic carboxylic acids and c) polyvalent organic carboxylic acids which, in addition to two carboxylic acid functions, have at least one other, optionally capped, i.e., OH and/or COOH function.

19 Claims, No Drawings

BIODEGRADABLE POLYMERS BASED ON NATURAL AND RENEWABLE RAW MATERIALS ESPECIALLY ISOSORBITE

This application is a continuation of International Application No. PCT/EP99/01112, whose international filing date is Feb. 20, 1999, which in turn claims the benefit of German Patent Application No. 198 09 913.4, filed Mar. 7, 1998, the disclosures of which application are incorporated by reference herein.

The invention relates to biodegradable polycondensates based on dianhydrohexitols, to their preparation, and also to their use.

Biodegradable polycondensates degrade within a certain period of time in a biological medium, losing their original mechanical, physical and chemical properties as a result of breakdown into small fragments, also termed metabolites when the application is in the physiological sector—in particular in humans. An example which may be quoted is a biodegradable surgical suture which initially has the strength to hold together a sutured wound but then in the course of time is degraded by the body. Of course, there must be an appropriate relationship here between the rate of degradation and the healing of the wound.

For the purposes of the present invention, biological media in which biodegradable polymers may be used are media which occur in the natural environment, for example water, air or soil, and also human or animal bodies, and the interior of plants. Biodegradable polymers are frequently used in forms which serve only a single purpose, for example surgical sutures which have solely the function of securing the wound for a particular time, or waste sacks or packaging films, which undergo biodegradation after use, the degradation products themselves not having any particular function.

However, it is also possible to admix active substances with the biodegradable polymers, or as early as during the synthesis of the polymers to give these a chemical form which allows the polymers themselves to develop other active functions besides any mechanical function which they have. For example, it is possible to produce surgical sutures which, besides their mechanical function, have a disinfecting action, for example, or develop a certain medicinal action. Waste sacks may comprise, for example, substances whose odor repels dogs and cats.

Another important factor for biodegradable polymers is that the degradation products are substantially compatible with the medium in which they arise. For example, it is clear that biodegradable polymers can only be used successfully in the medical sector if the fragments (known as metabolites) produced on biodegradation are nonhazardous.

Finally, there is also great interest in obtaining polycondensates substantially from starting materials which occur directly in the natural environment or are obtained from products which occur in the natural environment, that is to say from what are known as renewable raw materials. Particular compounds which are possible molecular building blocks here are those which occur in metabolism in the natural environment, either in humans, in animals or in plants. They also include compounds which can be obtained by hydrolysis, oxidation, reduction or elimination of water from products such as carbohydrates. These compounds also include what are known as dianhydrohexitols, which are obtained by dehydrating the corresponding hexahydric alcohols, specifically isosorbitol, a compound which is obtained by dehydrating sorbitol and is also called 1,4:3,6-dianhydro-D-sorbitol (DAS), 1,4:3,6-dianhydro-D-mannitol (DAM), a compound which is obtained by dehydrating mannitol, and 1,4:3,6-dianhydro-L-iditol (DAI).

There is already extensive literature, especially scientific publications, concerning the preparation of dianhydrohexitols and their use for preparing polycondensates. In this connection it should be pointed out that, especially in German publications, different names are given to one and the same compound. For example, the terms isosorbide, isomannide and isoidide are found in addition to 1,4:3,6-dianhydro-D-sorbitol (DAS) etc.

E. Flèche et al., for example in starch/stärke 38(1), 26–30 (1986) describe the preparation and properties of isosorbitol. J. Thiem et al., in starch/stärke 36 (5) 170–6 (1984) are concerned with the preparation and controlled polycondensation of anhydroalditol units from starch. Storbeck et al., in Makromol. Chem. 194, 53–46, 1993, describe the synthesis of polyesters from DAS, DAM (1,4:3,6-dianhydro-D-mannitol) and DAI (1,4:3,6-dianhydro-L-iditol). Other literature references which may be mentioned are Polymer 34 (23) 5003–6 (1993); Journal of Polymer Science: Part A: Polymer Chemistry 33, 2813–20 (1995); Journal of Applied Polymer Science 59, 1199–1202 (1996); Die Angewandte Makromolekulare Chemie 199 (No. 3530) 191–205 (1992) and 210 (No. 3659) 173–196 (1993).

DE-C 1 263 981 describes modified polyesters in which the glycol component may be composed of up to 20% by weight of isosorbitol, and which may moreover have branching brought about by polyfunctional esters of tri- to pentabasic acids. However, these polycondensates are not biodegradable.

Polycondensates which have amide functions are described in Trends in Polymer Science 2(12)425–36 (1994) and Journal of Polymer Science Part A: Polymer Chemistry 30, 2059–62 (1992), for example.

There are therefore numerous known biodegradable polycondensates, but these have a wide variety of disadvantages. For example, it is often difficult to establish a sufficiently high molecular weight, and other polycondensates release excessive amounts of injurious substances on biodegradation, and others again have limited availability due to high preparation costs. There is moreover a lack of polycondensates whose properties can be quite specifically adapted for particular applications.

Although there is already a wide variety of known biodegradable polycondensates, there is still a need for improved products, for improved preparation processes and for products which are versatile in use.

It is therefore an object of the invention to provide biodegradable polycondensates which have good degradation performance, are simple to produce and can be prepared partially or entirely from renewable raw materials, and which can be modified straightaway during their synthesis to make them suitable for a very wide variety of applications.

This object is achieved by means of biodegradable polycondensates as claimed in patent claim 1. Patent claims 2 to 7 give particularly advantageous embodiments of the novel polycondensates. These novel polycondensates may be prepared by processes as claimed in patent claims 8 to 11. Claims 12 and 13 give particularly advantageous ways of using the novel polycondensates.

a)

The dianhydrohexitols used according to the invention, specifically isosorbitol, isomannitol and isoiditol, may be prepared by processes known per se, by dehydrating the corresponding hexitols, such as sorbitol, mannitol, etc. These compounds, e.g. isosorbitol, can be obtained in relatively large volumes from starch, and are available commercially.

b)

The dibasic organic carboxylic acids used as second component may be aliphatic, cycloaliphatic or aromatic. Examples which may be mentioned here are terephthalic acid, adipic acid, furandicarboxylic acid, and also 3,6,9-trioxaundecanedicarboxylic acid, the use of which is preferred. The dicarboxylic acids may be used as such during the synthesis, but it is also possible to use appropriate derivatives, such as acid chlorides or esters of the carboxylic acids.

c)

Examples which may be mentioned of the polyfunctional organic carboxylic acids which, besides two carboxylic acid functions, have at least one other uncapped or capped function, specifically OH and/or COOH, are tartaric acid, malic acid, hydroxysuccinic acid, citric acid, isocitric acid, aconitic acid and the like. In particular, use may also be made of cholic acid or deoxycholic acid, the biological functions of which make them particular suitable for incorporation in functional biopolymers.

An additional point which should be mentioned for group c) is that these carboxylic acids may be used as such, that is to say with the two or more functions uncapped, i.e. free and accessible for an immediate condensation reaction, or capped, e.g. etherified or esterified. It is fully possible here for all three functions of some trifunctional units to be involved in the polymerization reaction. Partial reactions are also conceivable in which the reaction of only one functional group leads to incorporation into the polymer. This is what is known as a polymer end group function, and the polymerization reaction does not involve the two other functional groups. The functional groups not taking part in the polymerization reaction may either remain capped (protected) or have their capping removed following the preparation of the polymer, in a polymer-analogous reaction. This corresponds chemically to the cleavage of what is known as a protecting group, initially introduced in order to cap the function.

Besides these three components a), b) and c), other components may be incorporated into the biodegradable polycondensates, in particular bifunctional components, such as alpha amino acids, e.g. serine, glutamine, lysine, glutamic acid, aspartic acid, and cystein, and it is also possible to make concomitant use of hydroxycarboxylic acids or of dihydroxy compounds. Incorporation of molecules of this type does not alter the stoichiometric ratio of the two different functional groups. Incorporating, for example, 4-hydroxybenzoic acid increases the distances between monomers of the same type, as required by statistical laws, and thus has a controlled effect on the physical properties of the polymer in a manner known to the skilled worker, e.g. on glass transition temperature.

The polycondensation may be carried out by customary processes known per se, such as those known as one-pot reactions, in which all of the starting materials are mixed thoroughly at the very outset and are reacted with or without the use of a catalyst. This reaction may be carried out in the melt, or else in solution. However, continuous and semicontinuous processes are also possible.

Very suitable solvents besides dichloromethane, the use of which is preferred, include dimethylformamide, dimethyl sulfoxide and N-methylpyrrolidone.

It is appropriate for the reaction to be carried out by reacting equal molar amounts of OH and COOH groups. However, it is possible to deviate from the stoichiometric ratio, but the deviation from the stoichiometric ratio is preferably not more than 5 mol %.

Balancing of the stoichiometry of the different functional groups with respect to one another is generally advantageous. In the ideal case, diol components and dicarboxylic acid components, for example, are present in an equimolar ratio. For particular applications, e.g. if retarded or accelerated biodegradation is required, it may be appropriate to deviate from this ideal condition, and therefore it is also possible to prepare crosslinked polymers (gels) by methods known to the skilled worker.

The dianhydrohexitols, e.g. isosorbide, which are used according to the invention to build up the polycondensates react as glycols with the COOH groups of the carboxylic acids used. The molar amounts of these compounds used are preferably such that at least 50 percent, preferably at least 70 percent, of the COOH groups of the acids can react with the OH groups of the dianhydrohexitols.

The properties of the novel polycondensates may particularly advantageously be modified by incorporating other units, and it is therefore possible to prepare tailored polycondensates for specific applications. An example which may be mentioned here is the concomitant use of amino acids and hydroxycarboxylic acids, e.g. hydroxybutyric acid, 4-hydroxybenzoic acid, 2-hydroxy-6-naphthoic acid, 4-aminobenzoic acid, glycolic acid, 4-hydroxybiphenyl-4-carboxylic acid, lithocholic acid, or 4-hydroxycinnamic acid.

The novel polycondensates have very good biodegradability. Although there is no desire to lay down a theory here, it is likely that the improvement in biodegradability over other biodegradable polycondensates is brought about by the incorporation of the units with the at least three functions, i.e. by the polyfunctional carboxylic acid which have one or more additional OH or COOH functions, e.g. malic acid.

It is also possible to exert a further favorable effect on biodegradability by making concomitant use of condensable starting materials which have heteroatoms. 3,6,9-Trioxaundecanedicarboxylic acid especially should be mentioned here. It is also advantageous for there to be some concomitant incorporation of compounds which have amino functions.

For the purposes of the present invention, a biodegradable polycondensate is one which, when placed in an appropriate medium, is degraded over the course of time into relatively small cleavage products which are preferably nonhazardous to the environment, humans, animals and plants. For the purposes of the present invention, the concept of biodegradability includes concepts such as bioerodability, enzymatic cleavability, compostability, biodegradability, hydrolyzability, digestability, edibility etc.

The incorporation of compounds having more than two functional groups in the biodegradable polymers described here according to the invention makes these polymers especially suitable for use as functional biodegradable polymers.

The novel polymers may be processed in the melt, but may also be processed using appropriate solvents. They can be processed to give any conceivable type of molding, such as bags, films, tablets, capsules, fibers, hollow fibers, powders and the like.

They may be used in particular where controlled release of active substances is involved. The active substance here may have been incorporated into the polycondensate, and in this case is released during biodegradation in the medium itself and can then develop its action.

According to the invention it is also possible for the polycondensates to be used to produce articles, such as capsules, which encompass an active substance which is then either released after a certain time when the capsule has been dissolved or leached out from the capsule by the medium over the course of time.

However, it is also possible for the polycondensate to be used as a matrix, in this case the active ingredient is uniformly dispersed in the polymer, e.g. in the melt or else in a solution, so that degradation of the polycondensate is accompanied by release of the active substance.

The polycondensates may be used in a very wide variety of sectors. For example, they may be used in agriculture for the controlled release of fertilizers or of herbicides, pesticides or the like. Another application sector is the pharmaceutical sector, where the polycondensates can be used as tablets, for example. In the medical sector, the polycondensates may also be used subcutaneously, e.g. in an appropriate form, for example in the form of microparticles or of extrudates.

The preparation process is very flexible and controllable, and it is therefore even possible to produce different molecular weights, or else polycondensates with a tailored property profile.

The invention is further described by the examples below:

EXAMPLE 1

3.18 g (21.76 mmol) of L-isosorbitol, 2.472 g (10.88 mmol) of dichloro-2,3-o-isopropylidene L-tartrate, 2.209 g (10.88 mmol) of terephthalic dichloride, 50 ml of dried dichloromethane and 3.6 ml (44.60 mmol) of pyridine are mixed and refluxed for 3 days, with stirring. During this process a white precipitate forms. The polycondensate is then precipitated in cyclohexane, and after drying it is dissolved in tetrahydrofuran (THF)/acetone and precipitated in water, filtered off with suction and dried in vacuo.

White powder; yield 3.9 g corresponding to 64% of theory.

| Elemental analysis: | % C | % H |
|---|---|---|
| calc. | 56.3 | 4.9 |
| found | 56.8 | 5.3 |

Rotation determined in solution in dichloromethane $$\alpha_D^{25} = +82.4°$$

Molecular weight 6,700 ($M_w$) (after previous calibration of a gel permeation chromatography (GPC) system using polystyrene standard).

EXAMPLE 2

3.046 g (20.8 mmol) of L-isosorbide, 1.15 g (6.28 mmol) of adipic dichloride, 3.31 g (14.57 mmol) of dichloro-2,3-o-isopropylidene L-tartrate, 70 ml of dried dichloromethane and 3.3 ml (41.72 mmol) of pyridine are mixed, and then the procedure continues as in example 1.

White powder, yield 3.8 g corresponding to 63% of theory.

| Elemental analysis: | % C | % H |
|---|---|---|
| calc. | 53.1 | 5.6 |
| found | 58.4 | 5.5 |

Rotation determined in solution in dichloromethane: $\alpha_D^{25} = +78.6°$

Molecular weight 6,400 Dalton ($M_w$), polydispersity ($M_w/M_n$)=2.9 (after previous calibration of a gel permeation chromatography (GPC) system using polystyrene standard).

EXAMPLE 3

3.193 g (21.85 mmol) of L-isosorbide, 1.489 g (6.55 mmol) of dichloro-2,3-o-isopropylidene L-tartrate, 2.952 g (15.30 mmol) of furandicarboxylic dichloride, 70 ml of dried dichloromethane and 3.5 ml (44.5 mmol) of pyridine are mixed, and then the procedure continues as in example 1.

White powder, yield 4.9 g corresponding to 83% of theory.

| Elemental analysis: | % C | % H |
|---|---|---|
| calc. | 42.3 | 4.3 |
| found | 42.9 | 4.5 |

Rotation determined in solution in dichloromethane: $\alpha_D^{25} = -35.3°$

Molecular weight 8,200 Dalton ($M_w$) (after previous calibration of a gel permeation chromatography (GPC) system using polystyrene standard).

EXAMPLE 4

The biodegradability of the polymers was studied using a modified Sturm test. The test was carried out to OECD Guideline 301 B (1992; Sturm test). The test serves to determine the biodegradability of organic substances by aerobic microorganisms in an aqueous test medium. The organic test substance is the sole source of carbon in the experiment and is therefore the supplier of energy for the microorganisms. The degradation of the organic substances to be studied here is determined indirectly via measurement of the amount of carbon dioxide evolved. Each test lasts for 28 days. Sodium benzoate serves as an internal standard.

The detailed test conditions are: a supernatant used from activated sludge from the Frankfurt Niederrad sewage-treatment plant (10 ml per 1 l of test mixture); brown glass bottles of 5 l capacity; magnetic stirrer, room temperature, $CO_2$ determined via barium carbonate formation in aqueous $Ba(OH)_2$ solution and back-titration of the excess of alkali.

| TIME (DAYS) | BLIND MIXTURE $CO_2$ (mg) | SODIUM BENZOATE $CO_2$ (mg) | SODIUM BENZOATE DEGREE OF DEGRADATION (%) | POLY-L-LACTIC ACID DEGREE OF DEGRADATION (%) COMPARATIVE EXAMPLE |
|---|---|---|---|---|
| 1 | 0.7 | 1.6 | 1 | 2 |
| 4 | 2.4 | 24.3 | 34 | 8 |

-continued

| TIME (DAYS) | BLIND MIXTURE $CO_2$ (mg) | SODIUM BENZOATE $CO_2$ (mg) | SODIUM BENZOATE DEGREE OF DEGRADATION (%) | POLY-L-LACTIC ACID DEGREE OF DEGRADATION (%) COMPARATIVE EXAMPLE |
|---|---|---|---|---|
| 7 | 3.6 | 40.7 | 58 | 18 |
| 11 | 4.6 | 50.7 | 72 | 38 |
| 14 | 5.3 | 55.6 | 78 | 53 |
| 18 | 6.7 | 59.3 | 81 | 64 |
| 21 | 8.4 | 61.9 | 83 | 71 |
| 25 | 10.7 | 65.4 | 85 | 79 |
| 28 | 14.8 | 69.6 | 85 | 82 |

| TIME (DAYS) | SODIUM BENZOATE DEGREE OF DEGRADATION (%) | POLYMER EXAMPLE 1 DEGREE OF DEGRADATION (%) | POLYMER EXAMPLE 2 DEGREE OF DEGRADATION (%) | POLYMER EXAMPLE 3 DEGREE OF DEGRADATION (%) |
|---|---|---|---|---|
| 1 | 1 | 1 | 2 | 2 |
| 4 | 34 | 2 | 14 | 8 |
| 7 | 58 | 20 | 29 | 26 |
| 11 | 72 | 51 | 58 | 45 |
| 14 | 78 | 66 | 75 | 61 |
| 18 | 81 | 79 | 79 | 74 |
| 21 | 83 | 83 | 83 | 78 |
| 25 | 85 | 86 | 85 | 82 |
| 28 | 85 | 89 | 87 | 85 |

What is claimed is:

1. A biodegradable polycondensate which derives from at least three components, selected from the group consisting of
   a) dianhydrohexitols,
   b) dibasic organic carboxylic acids, and
   c) polyfunctional organic carboxylic acids which, besides two carboxylic acid functions, have at least one other uncapped or capped function.

2. A biodegradable polycondensate as claimed in claim 1, wherein the dibasic organic carboxylic acid is terephthalic acid.

3. A biodegradable polycondensate as claimed in claim 1, wherein the dibasic organic carboxylic acid is 3,6,9-trioxaundecanedicarboxylic acid.

4. A biodegradable polycondensate as claimed in claim 1, wherein the dibasic organic carboxylic acid is furan dicarboxylic acid.

5. A biodegradable polycondensate as claimed in claim 1, wherein the polyfunctional organic carboxylic acid of c) is tartaric acid.

6. A biodegradable polycondensate as claimed in claim 1, wherein the polyfunctional organic carboxylic acid of c) is uvic acid.

7. A biodegradable polycondensate as claimed in claim 1, wherein the uncapped or capped function is at least one of OH or COOH.

8. A biodegradable polycondensate as claimed in claim 1, wherein the polyfunctional organic carboxylic acid of c) is citric acid.

9. A process for preparing biodegradable polycondensates as claimed in claim 7, which comprises reacting the starting materials in the melt.

10. A process for preparing biodegradable polycondensates as claimed in claim 7, wherein the starting materials are reacted in a solvent.

11. The process as claimed in claim 10, wherein dichloromethane is used as solvent.

12. The process for preparing biodegradable polycondensates as claimed in any of claim 9, wherein the ratio in which the starting materials are reacted, based on the OH and COOH functions, is equimolar ±5 mol %.

13. A method of encapsulating active substances comprising encapsulating the active substance in a material comprising the biodegradable polycondensate as claimed in claim 1.

14. A method of encapsulating active substances comprising encapsulating the active substance in a material comprising a biodegradable polycondensate prepared by the process as claimed in claim 9.

15. A method of receiving active substances comprising receiving the active substance in a matrix material comprising the biodegradable polycondensate as claimed in claim 1.

16. A method of receiving active substances comprising receiving the active substance in a matrix material comprising a biodegradable polycondensate prepared by the process as claimed in claim 9.

17. The process for preparing biodegradable polycondensates as claimed in claim 10, wherein the ratio in which the starting materials are reacted, based on the OH and COOH functions, is equimolar ±5 mol %.

18. A method of encapsulating active substances comprising encapsulating the active substance in a material comprising a biodegradable polycondensate prepared by the process as claimed in claim 10.

19. A method of receiving active substances comprising receiving the active substance in a matrix material comprising a biodegradable polycondensate prepared by the process as claimed in claim 10.

* * * * *